United States Patent

Bigo et al.

[11] Patent Number: 6,036,611
[45] Date of Patent: Mar. 14, 2000

[54] DRIVE MECHANISM FOR DRIVING DISPLACEMENT MEMBERS DISPOSED IN TANDEM

[75] Inventors: Louis Bigo, Compiegne; Pascal Le Yaouanq, Choisy au Bac; Jean-Noel Pogneau, Creil; Gilbert Mahe, Senlis; Vincent Siquier, Tracy le Mont; Jean-Claude Lallier, Crepy en Valois; Dany Leturque, Verberie, all of France

[73] Assignee: Poclain Hydraulics Industrie, Verberie Cedex, France

[21] Appl. No.: 09/093,322

[22] Filed: Jun. 8, 1998

Related U.S. Application Data

[60] Provisional application No. 60/051,853, Jul. 7, 1997.

[51] Int. Cl.[7] .............................. F16H 7/00; F16H 57/02; F16H 7/24
[52] U.S. Cl. ........................... 474/88; 474/146; 474/150; 74/606 R
[58] Field of Search .............................. 474/84, 88, 144, 474/146, 148, 150, 73; 74/606 R, 608, 609

[56] References Cited

U.S. PATENT DOCUMENTS

| | | | |
|---|---|---|---|
| 3,435,798 | 4/1969 | Rieli ........................................ | 114/270 |
| 4,326,450 | 4/1982 | Bacquie ..................................... | 91/487 |
| 4,572,311 | 2/1986 | Oswald et al. .......................... | 180/6.48 |
| 5,290,201 | 3/1994 | Tesker ..................................... | 460/116 |

FOREIGN PATENT DOCUMENTS 0163488   12/1985   European Pat. Off. .

Primary Examiner—David A. Bucci
Assistant Examiner—Matthew A. Kaness
Attorney, Agent, or Firm—Ladas & Parry

[57] ABSTRACT

A drive mechanism (10, 110) for driving first and second displacement members (12, 14, 112, 114) disposed in tandem. The mechanism includes first and second driven sprockets (16, 18; 116, 118) for respective ones of the displacement members, a hydraulic motor (20; 120), and first and second driving sprockets (22, 24; 122, 124) disposed on the casing of the hydraulic motor so as to be rotated thereby. The mechanism also includes first and second chains (26, 28; 126, 128) disposed in a chain case (30; 130), each chain being engaged on a respective driven sprocket and on a respective driving sprocket. The hydraulic motor (20, 120) is a low-speed high-torque motor, having radial cylinders and a rotary casing. The motor is substantially contained in the chain case (30; 130).

13 Claims, 7 Drawing Sheets

DRIVE MECHANISM FOR DRIVING DISPLACEMENT MEMBERS DISPOSED IN TANDEM

This application claims benefit of Provisional Appl. 60/051,853 filed Jul. 7, 1997.

BACKGROUND OF THE INVENTION

The present invention relates to a drive mechanism for driving first and second displacement members disposed in tandem, and to a set for driving first and second tandems of displacement members for displacing a vehicle.

The mechanism comprises:

first and second driven sprockets respectively secured to the first and second displacement members;

a hydraulic motor comprising a motor casing, a reaction member integral with the motor casing, and a cylinder block which is mounted so that the reaction member and the cylinder block rotate relative to each other about an axis of rotation, the cylinder block comprising a plurality of sets of cylinders and of pistons suitable for being fed with fluid under pressure;

first and second driving sprockets which are mounted to be rotated by the hydraulic motor; and first and second chains disposed in a chain case, the first chain engaging the first driven sprocket and the first driving sprocket, while the second chain engages the second driven sprocket and the second driving sprocket.

Mechanisms of that type are already known and used to equip vehicles of the compact loader or earth mover type. Such vehicles are provided with a set of two mechanisms of the above-mentioned type, respectively for driving two right-side wheels and two left-side wheels. In this way, it is possible to guarantee that the two wheels in the same group of side wheels rotate at the same speed, but, insofar as the two groups of wheels are driven by distinct motors, it is possible to control steering of the vehicle better. For example, for a compact loader, such mechanisms make it possible to rotate the wheels in the right-side group and the wheels in the left-side group at different speeds, or even in opposite directions, which makes the vehicle very maneuverable by making it possible for it to turn around on the spot.

At least one of the displacement members of the tandem may be different from a wheel, and may, for example, be constituted by a crawler track. In particular for a loader, it is desirable to make the vehicle as compact as possible. As a result, it must be possible in a very small space, to house the various constitutive elements of the two mechanisms which serve to drive respective ones of the two tandems of wheels. The driver's seat and cab and the various controls must also be accommodated, as must the transmission assembly including in particular the pumps that serve to feed the hydraulic motors, and the motor for actuating the pumps. Hydraulic motors used in the prior art to displace this type of vehicle are generally motors of the geroller type, or axial-piston high-speed motors, coupled to stepdown gears. The driving sprockets are disposed on the outlet shaft of the hydraulic motor, and they penetrate into the chain case so that the first and second chains respectively engage them.

Such motors, with their stepdown gears and their outlet shafts are relatively bulky. Even when, to make a compact vehicle, attempts are made to dispose the motors inside the chassis of the vehicle, considerable space is required in the chassis, and the driving sprockets for the chains are cantilevered out considerably relative to the motor, so that the bearings and the shaft of the motor, have to bear very considerable stresses and have to be dimensioned accordingly.

BRIEF DESCRIPTION OF THE INVENTION

An object of the present invention is to provide an improved drive mechanism which can be installed in a small space to make compact vehicles, and in which, in particular, the hydraulic motor and the driving sprockets can be disposed in a small space.

This object is achieved by the facts that the hydraulic motor is a low-speed high-torque motor, whose cylinders are disposed radially about the axis of rotation, whose reaction member is an undulating cam comprising a plurality of lobes, and whose cylinder block is fixed while the reaction member and the motor casing are mounted to rotate about the axis of rotation, that the driving sprockets equip the motor casing, and that the motor is substantially contained in the chain case.

It can be understood that, by using a low-speed high-torque hydraulic motor, it is possible to omit the gear that is sometimes necessary in the prior art. In addition, by choosing a motor whose cylinders are disposed radially, it is possible to increase the axial compactness of the motor considerably. Furthermore, a "rotary casing" motor is used, which makes it possible to implement the drive sprockets directly on the motor casing, and therefore to omit a drive shaft carrying the sprockets. In this way, it is also possible to avoid the problems existing in the prior art caused by the fact that the prior art sprockets are cantilevered out relative to the motor. Finally, according to the invention, most of the motor is placed in the chain case. This makes it possible to increase considerably the compactness of the mechanism compared with the prior art mechanism whose width as measured in the axial direction of the motor is not less than the width of the chain case plus the length of the motor. With the invention, the total width is substantially equal to the width of the chain case. When the total width of the motor is slightly larger than the width of the chain case, a small portion of the motor could extend into the inspection hole generally provided in the wall of the case to enable work to be carried out on the chains, so that it is unnecessary to increase the width of the case.

The low-speed high-torque motor used for the invention, of the type referred to as a "slow motor", rotates its rotary casing at rotary speeds under normal operating conditions of approximately in the range 70 revolutions per minute (r.p.m.) to 300 r.p.m. For example, for motors equipping compact loaders, the rotary speed may be about 75 r.p.m. and the cubic capacity in the range 1 liter per revolution to 3 liters per revolution (1/r).

The motor further includes distribution means comprising a rotary portion which is constrained to rotate with the motor casing about the axis of rotation, and which is provided with distribution ducts suitable for communicating with the cylinders, and a fixed portion which is prevented from rotating about the axis of rotation and which is provided with fluid inlet and fluid outlet ducts suitable for communicating with the distribution ducts of the internal fluid distributor. Advantageously, the fixed portion of the distribution means has a "connection" end face in which the fluid inlet and fluid outlet ducts open out, which ducts have ends situated in the connection face, and the chain case is provided with a fixing element to which the motor is fixed, and with a "connection wall" in which at least one opening is provided to enable the fluid to be fed in and to be removed via said fluid inlet and fluid outlet ducts.

By means of these dispositions, the fluid inlet and fluid outlet ducts as well as any other ducts performing accessory functions of the motor are grouped together in the connection face of the motor and are easily accessible via the connection wall. It suffices to choose that the connection wall is located on the inside of the vehicle for it to be possible to connect the motor to external pipes that are short, since the pump is generally placed in the space inside the vehicle. This is particularly relevant when the two mechanisms that serve to feed respective tandems of side wheels are housed in distinct cases.

Advantageously, at least one of the driving sprockets is disposed on the outside periphery of a "cam" portion of the motor, the undulating cam being provided on the inside periphery of said cam portion.

This disposition offers several advantages, including simplifying manufacture of the motor because the cam situated on the inside periphery of the cam portion and the driving sprocket situated on the outside periphery of the portion can be made in a single common manufacturing step. Advantageously, both driving sprockets are disposed on the cam portion.

BRIEF DESCRIPTION OF THE DRAWINGS

The invention will be well understood, and its advantages will appear more clearly on reading the following detailed description of embodiments given by way of non-limiting example and with reference to accompanying drawings, in which.

DETAILED DESCRIPTION

Figure 1:
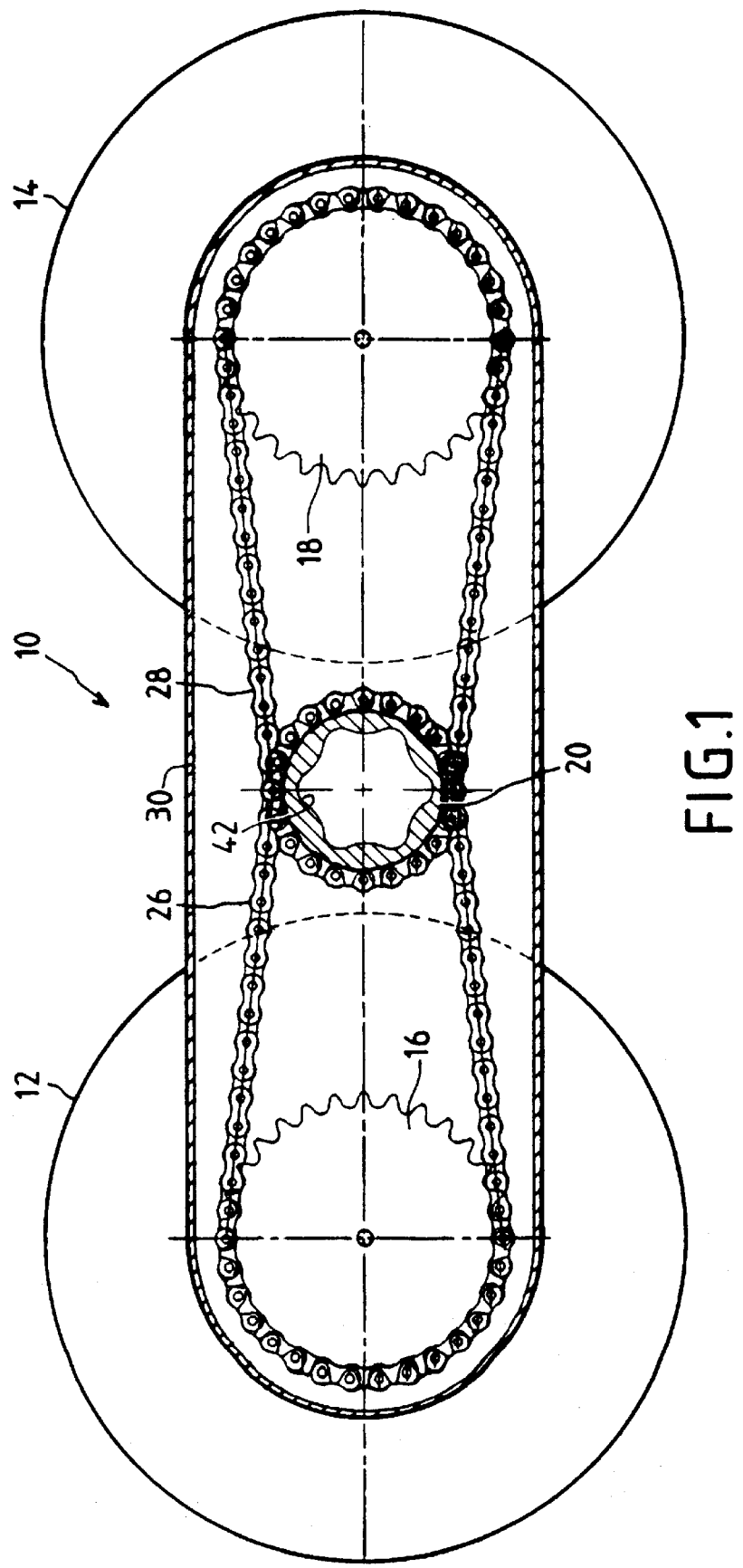
FIG. 1 is a diagrammatic side view of a mechanism of the invention, suitable for driving a pair of wheels disposed in tandem.
Figure 2:
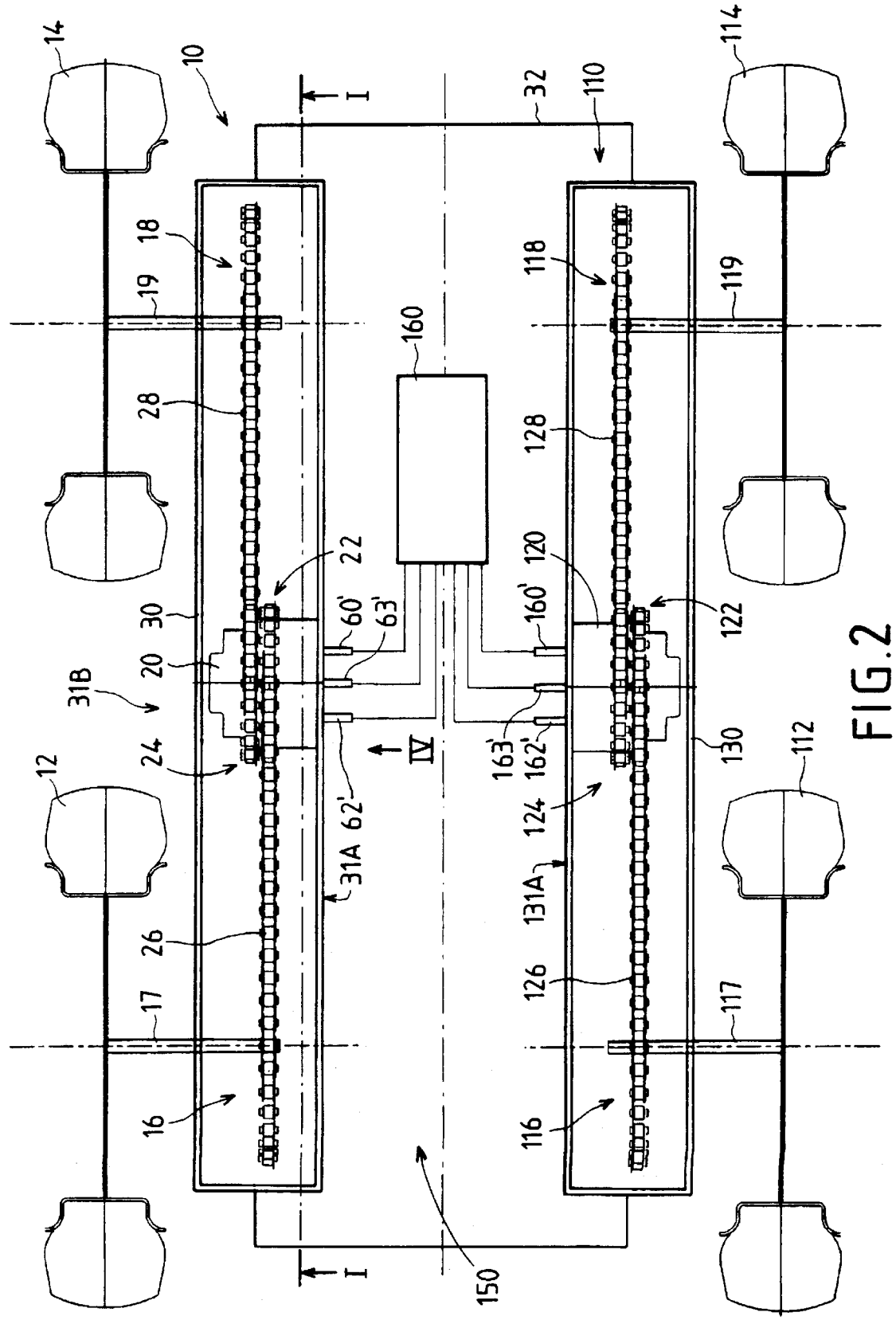
FIG. 2 is a plan view showing two mechanisms analogous to the mechanism shown in FIG. 1, suitable for driving two pairs of tandem wheels of a vehicle.

FIG. 1 is a section view on line I—I of FIG. 2, on which, to simplify it, certain elements of the mechanism are shown in outline only, in particular the motor.

The mechanism 10 shown in FIG. 1 serves to drive first and second wheels 12 and 14 of a vehicle, the wheels being disposed in tandem. The mechanism comprises:

a first driven sprocket 16 connected to the axle 17 of the wheel 12, and a second driven sprocket 18 connected to the axle 19 of the wheel 14;

first and second driving sprockets 22 and 24, equipping the casing of the motor 20, and mounted to be rotated by said motor; and first and second chains 26 and 28 disposed in a chain case 30.

The first chain 26 engages the first driven sprocket 16 and the first driving sprocket 22, while the second chain 28 engages the second driven sprocket 18 and the second driving sprocket 24.

The plan view in FIG. 2 shows a set comprising a first mechanism 10 serving to drive the first tandem of wheels 12 and 14, and a second mechanism 110, analogous to the first mechanism, serving to drive a second tandem of wheels 112 and 114. Since the two mechanisms are analogous, the mechanism 110 is allocated the same references as the mechanism 10, plus 100.

The set shown in FIG. 2 may be used to drive two tandems of wheels on a vehicle such as a compact loader or an earth mover. The two chain cases 30 and 130 are then mounted on the chassis of the vehicle, which chassis is shown very diagrammatically and designated by the reference 32 in FIG. 2.

The hydraulic motor 20 equipping the mechanism 10 is described below with reference to FIG. 3. The motor comprises:

a casing in two portions 40A and 40B, assembled together by means of screws 41;

a reaction member constituted by an undulating cam 42 formed on the inside periphery of the portion 40A of the casing (the cam 42 can be seen better in the diagrammatic section view of FIG. 1 which does not however show the other internal elements of the motor);

a cylinder block 44 disposed inside the casing, the casing being mounted to rotate relative to the cylinder block about an axis of rotation 46; the cylinder block comprising a plurality of cylinders 48 which are disposed radially about the axis of rotation 46, and in which pistons 50 are slidably mounted, the pistons naturally also being disposed radially and being suitable for being fed with fluid under pressure, the outer radial ends of the pistons reacting against the undulating cam 42;

an internal fluid distributor 52 provided with distribution ducts 54 suitable for being put in communication with the cylinder ducts 56 for feeding the cylinders 48 with fluid under pressure, the distributor constituting the rotary portion of the distribution means; and a fixed distribution core 58 which constitutes the fixed portion of the distribution means and which is provided with ducts 60 and 62 which, depending on the rotation direction of the motor, perform a fluid feed function or a fluid removal function, the ducts 60 and 62 opening out into respective grooves 64 and 66 provided between the axial outside periphery of the core 58 and the axial inside periphery of the internal fluid distributor 52, the distribution ducts 54 opening out into these grooves so as to be put into communication with the ducts 60 or 62.

The grooves 64 and 66 are staggered relative to each other and are sealed by gaskets 68, 70, and 72, disposed between staggered axial portions of the outside axial face 59 of the core 58 and of the inside axial face 53 of the internal fluid distributor 52. The distribution ducts 54 open out in a distribution face 74 of the distributor 52 which is held, by means of mechanical bias means (e.g. one or more springs 75), or by hydraulic pressing means, in abutment against the communication face 76 of the cylinder block, in which face the cylinder ducts 56 open out. Both the cylinder block 44 and the core 58 are prevented from rotating about the rotation axis 46 (indeed they may form a single piece), but the casing 40A, 40B and the distributor 52 rotate relative to said axis, the distributor being constrained to rotate with the portion 40B of the casing by any suitable means such as, for example, fluting, a keying system, or a stud-and-notch system (not shown).

The portion 40A of the casing is supported to rotate relative to the cylinder block by means of a bearing 78 advantageously constituted by a rolling bearing having four contact points comprising balls 80 disposed in rolling tracks formed by two facing grooves 82 and 84 provided respectively in the inside axial face of the portion 40A of the casing and in the outside axial face of the cylinder block 44. Naturally, it is possible to use other types of bearing, e.g. conventional ball bearings or conical bearings, but ball bearings having four contact points offer the advantage, particularly in the context of the present invention, of requiring an extremely small amount of axial space to provide support for the portion 40A of the casing as it rotates.

The inside of the motor is sealed from the outside by means of sealing gaskets 86 and 88.

The cylinder block is wedged axially relative to the core 58 by means of a stop ring 90 or by any equivalent means.

The motor further includes a braking system including a first braking member secured to the cylinder block so that it is prevented from rotating about the axis 46, and a second braking member constrained to rotate with the casing about the axis 46. The braking system further includes means for urging the braking members towards each other so that they co-operate for braking purposes, and for urging them apart.

Figure 3:
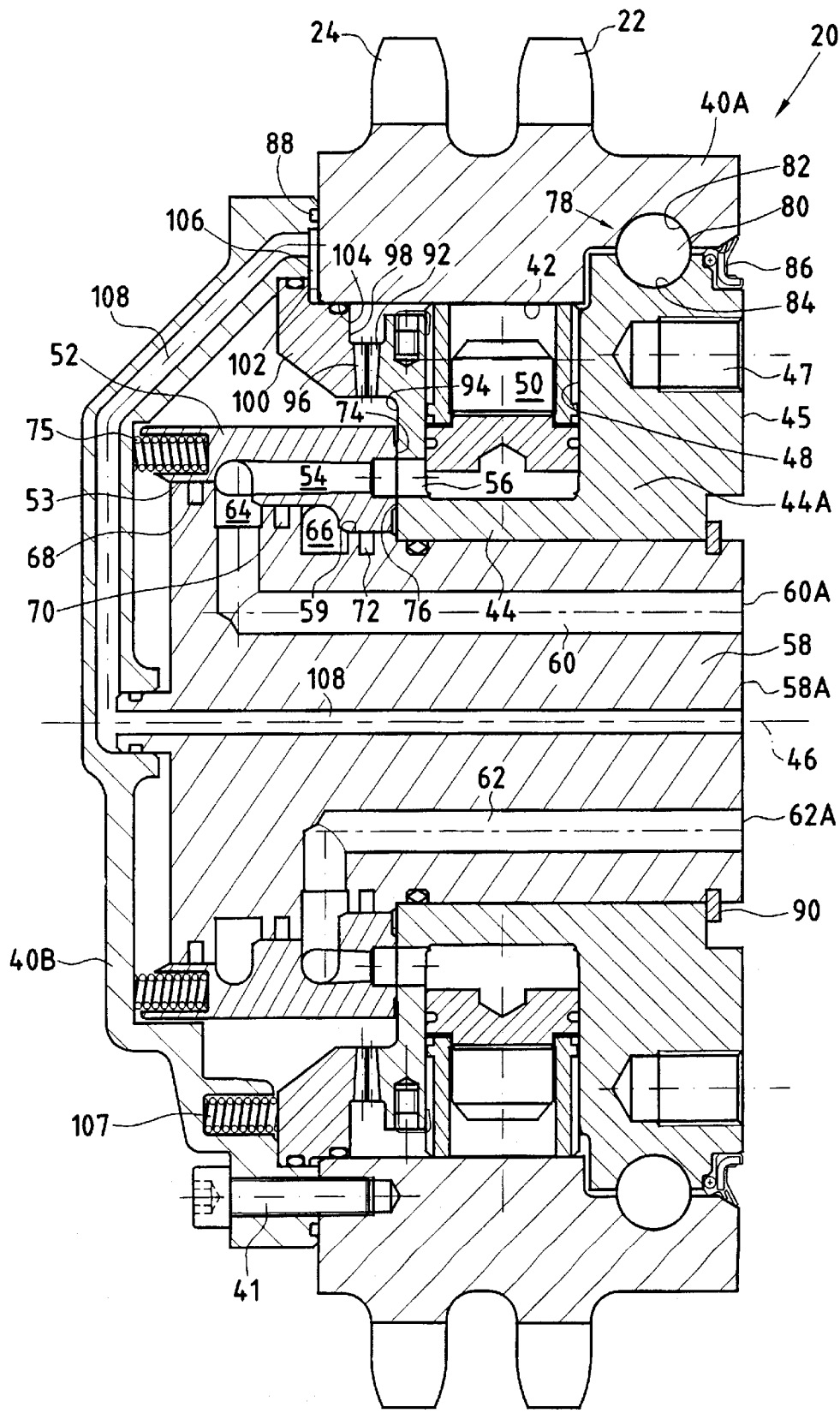
FIG. 3 is an axial section view of the motor of the mechanism of the invention.

More precisely, in the braking system shown in FIG. 3 by way of advantageous example, the first braking member is provided with a first series of positive clutch teeth 96 integral with a radial face 98 of a braking piston 100 which has a first axial coupling segment 102 situated on its outside axial periphery, which segment co-operates with a second axial coupling segment 104 situated on an axial extension of the cam 42 which extends above the piston 100.

The second braking member is provided with a second series of teeth 92 integral with a transverse face of the cylinder block 94. The second coupling segment constitutes the extension to the cam, and its internal outline is thus analogous to the undulating reaction outline of the cam. The external outline of the first coupling segment is complementary to the internal outline of the second coupling segment, thereby making it possible to lock the piston 100 so that it is constrained to rotate with the portion 40A of the casing, and constituting surfaces through which the braking torque can pass.

The braking system further includes a brake release chamber 106 which is suitable for being fed with fluid under pressure via a brake release duct 108 so as to urge the piston 100 away from the cylinder block, thereby causing the co-operation between the positive clutch teeth 92 and 96 to cease. The action of the fluid contained in the brake release chamber opposes that of the resilient return means 107, e.g. constituted by a conical spring washer or by helical springs, which continuously urge the piston 100 towards the cylinder block. The face 94 of the cylinder block, which face is provided with the first series of teeth 92, is the face that is nearer the internal distributor 52, and the piston 100 is received in an annular space provided above the distributor. The brake for the motor is thus implemented with maximum axial compactness.

The outside periphery of the portion 40A of the casing of the motor 20 is equipped with the driving sprockets 22 and 24 mentioned above with reference to FIG. 2.

Advantageously, at least one of the driving sprockets is disposed on the outside periphery of a "cam" portion of the casing of the motor, on the inside periphery of which portion the cam is formed. This is the case in the example shown, in which both sprockets 22 and 24 are disposed on the outside periphery of the portion 40A of the casing, which portion constitutes a cam portion because the cam 42 is implemented on its inside periphery.

The motor shown by way of example in FIG. 3 includes a casing implemented in two portions only, the second portion 40B being essentially in the form of a transverse end plate which closes the motor in the vicinity of the distributor. The portion 40B may however be organized to support a sprocket. In the same way, depending on the case and, in particular, depending on the shape of the bearing which supports the casing as it rotates relative to the cylinder block, the casing may be made in three portions, only a central portion carrying the cam. The first and second driving sprockets may then be formed on the outside peripheries of two distinct portions of the casing of the motor. Advantageously, one of these portions of the casing is constituted by the cam portion.

Advantageously, each of the sprockets is formed in one piece with the casing portion on which it is disposed. Such a configuration makes it possible to limit the number of parts making up the motor, and therefore to simplify assembly thereof. In particular, when one sprocket or both sprockets as shown in FIG. 3 is/are made in one piece with the cam portion of the casing of the motor, the number of parts which are difficult to machine is small.

In a variant, at least one of the driving sprockets may be formed on a part which is distinct from the casing of the motor and which is fixed to the casing by fixing means for constraining it to rotate with the casing. The possible existence of this variant is illustrated in FIG. 3 by dashed lines, and it can be seen that the driving sprocket 22 may be implemented in the form of a distinct part 22' which is in the form of a toothed ring, and which may be fixed to the portion 40A of the casing via its inside periphery. The means for fixing it and constraining it to rotate with the casing may, for example, use assembly modes such as an interference fit, axial or helical fluting, or other coupling means.

In the example shown in FIG. 3, the casing of the motor is supported as it rotates relative to the cylinder block by means of a single bearing 78. The two driving sprockets 22 and 24 are situated in regions close to the bearing, and, above all, they extend substantially above the cam 42. Both of them extend on the same side of the bearing 78 which is implemented on that side of the cylinder block which is further from the distributor, the cylinder block including a radial flange 44A in which the groove 84 of the bearing 78 is formed.

By way of a variant, it is also possible to choose to dispose one of the driving sprockets on a first side of the single bearing having four contact points, and to dispose the other driving sprocket on the other side. This variant may be particularly advantageous when the bearing can be situated in a central region of the motor, which is possible, for example, if the cylinder block includes two axially spaced apart groups of cylinders between which groups a flange is disposed whose outside axial periphery may carry the internal rolling groove of the bearing having four contact points. It may be advantageous to choose two groups of cylinders when it is desired to increase the cubic capacity of the motor or when it is desired to apply the invention to a motor having two distinct operating cubic capacities.

In yet another variant (not shown), it is also possible to choose to equip the motor with two distinct bearings that are conventional ball bearings or conical bearings and that are provided on either side of the cylinder block, the rolling tracks being, for example, integral respectively with the casing of the motor and with the cylinder block, or being formed in independent bearing rings, and being fixed respectively to the casing and to the cylinder block. In which case, the driving sprockets are advantageously disposed substantially facing respective ones of the two bearings, which makes it possible to avoid them being cantilevered out.

On the motor shown in FIG. 3, the fixed portion of the distribution means, i.e. the fixed core 58, has an end face 58A in which the respective ends 60A and 62A of the fluid inlet duct and of the fluid outlet duct are located. Below, the end face 58A is referred to as the "connection face". The connection face is situated on that side of the motor which is further from the internal fluid distributor 52.

When it is indicated that the motor is "substantially contained" in the chain case, it is to be understood that the motor is almost entirely disposed inside the case, except possibly for said connection face which may project slightly from the case. In the example shown, the ends 60A and 62A extend in a plane that is substantially transverse to the axis of rotation 46. Alternatively, the connection face may be constituted by an end portion of the outside axial face of the core 58 which projects from the chain case when the motor is fixed therein. In which case, the ends of the fluid inlet duct and of the fluid outlet duct may be located in this axial portion, which in certain particular configurations where axial access to the motor is difficult makes it possible to connect the inlet duct and the outlet duct to external pipes disposed radially relative to the motor.

In any event, the chain case 30 includes a fixing element on which the motor is fixed and a connection wall 31A in which an opening is provided to make it possible for the fluid to be fed in and removed via the inlet and outlet ducts 60 and 62. In the example shown by way of advantageous variant, the fixing element of the case is provided on the connection wall 31A and is constituted directly by said wall. However, the motor may be fixed to another portion of the case 30. In particular, depending on its axial size, it may be advantageous to fix it to that side wall 31B of the chain case 30 which is further from the connection wall 31A, the motor fixing means then being located on that casing portion 40B of the motor which is further from its connection face.

Figure 4:
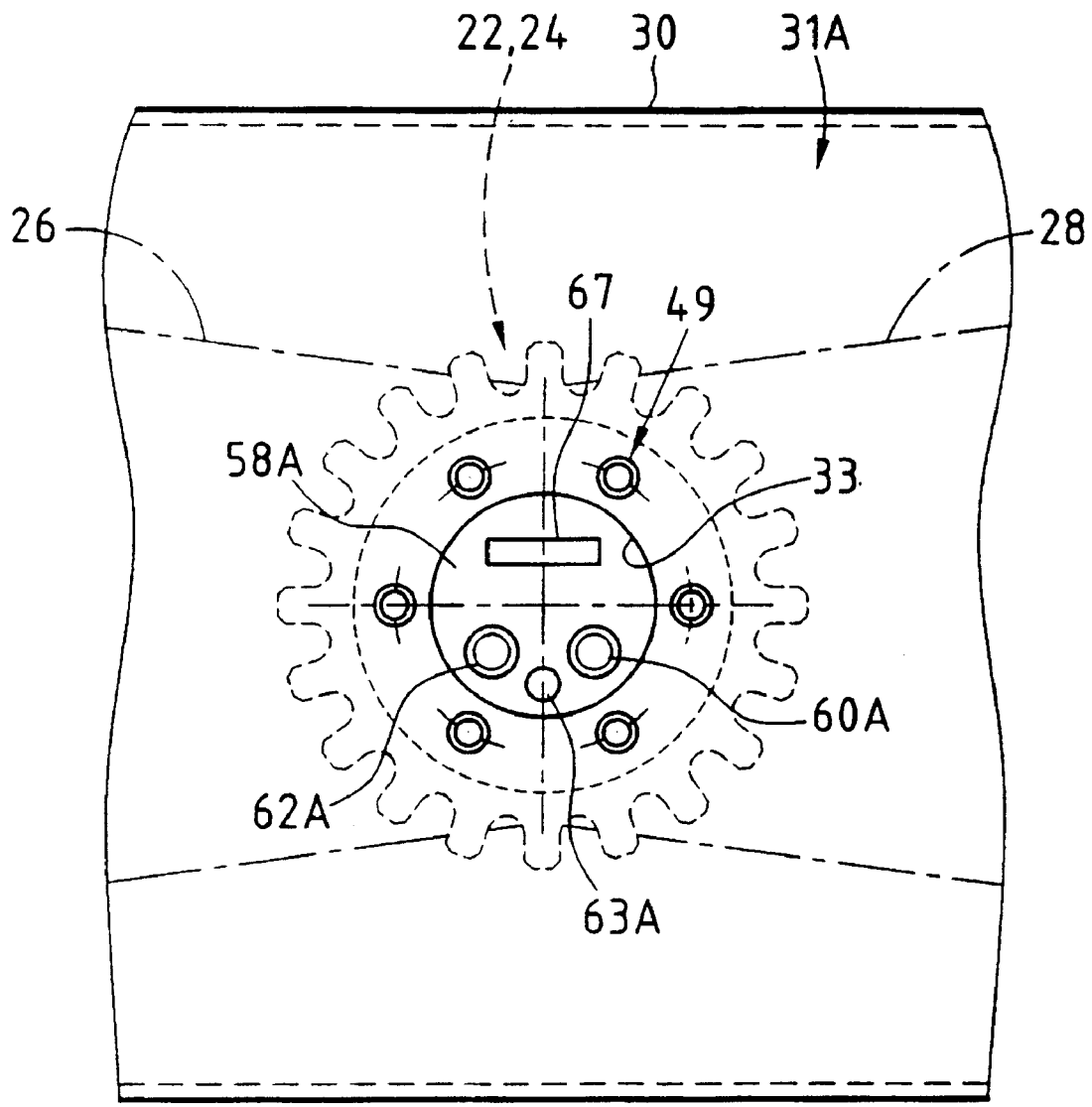
FIG. 4 is a view looking along arrow IV of FIG. 2.

FIG. 4 is an extremely diagrammatic view seen from the outside of the connection wall 31A of the case, which wall also serves as a fixing element for the motor. The connection wall 31A is provided with an opening 33 in which the connection face 58A of the motor is located. The ends 60A and 62A of the inlet duct and of the outlet duct of the motor, and the end 63A of a leakage return duct 63A are located in the connection face. The connection face may also be provided with other orifices such as that of an irrigation duct or that of any other hydraulic duct with which the motor is provided, e.g. for controlling a selector slide for selecting the cubic capacity if the motor is equipped with such a slide. Similarly, the connection face may also include links other than hydraulic links, e.g. electronic links 67 used, for example, to control electrically-driven valves, or a sensor for sensing the rotary speed of the motor, the sensor being disposed in the motor. Advantageously, as in the example shown in FIG. 4, the connection wall 31A of the chain case 30 is provided with a single opening 33 of sufficient size to provide on its own access to all of the connection, hydraulic, electronic, or other orifices which are located in the connection face of the motor. It is also possible to provide a plurality of openings, each of which is disposed facing one or more orifices in the connection face of the motor.

As shown in FIG. 3, the cylinder block 44 of the motor has an end face 45 which extends substantially in the same plane, extending transversely to the axis of rotation, as the connection face 58A, and which is provided with means for fixing it to the connection wall of the chain case. The fixing means comprise, for example, axial bores 47 provided in the cylinder block, or, more precisely, in its flange 44A, and corresponding holes 49 drilled in the connection wall 31A of the chain case 30, which holes receive fixing screws.

The chain case 30 contains oil serving to lubricate the chains of the mechanism continuously. The motor is disposed in such manner as to close completely the opening in the connection wall so as to prevent oil from spraying out from the chain case. Optionally, if sealing is required, a sealing gasket may be disposed between the motor and the inside face of the connection wall of the chain case.

In FIG. 2, the connection wall 31A of the chain case 30 and the connection wall 131A of the chain case 130 face each other, and a space 150 is provided between the two chain cases 30 and 130. This space is situated in the center of the vehicle, and it serves to receive various elements such as, in particular, the elements of the transmission and of the hydraulic circuit 160, represented extremely diagrammatically merely by a box to which the leakage ducts from hydraulic motors 20 and 120 of the two mechanisms are connected via external pipes 63' and 163', as are their inlet ducts and their outlet ducts, respectively via external pipes 60', 62', 160', and 162'. The various controls for controlling the vehicle may also arrive in this space 150, and the driver's seat may be situated above said space.

Figure 5:
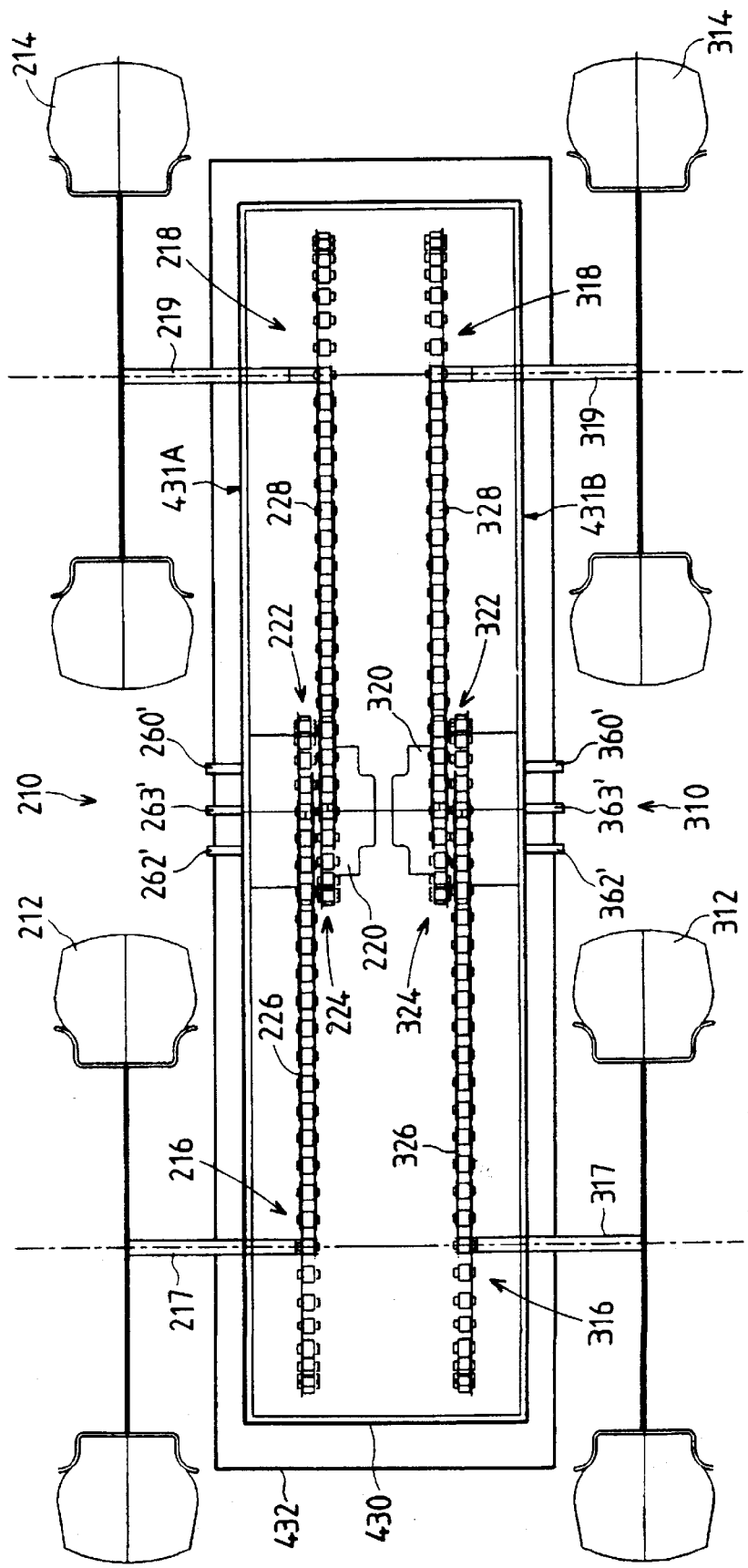
FIG. 5 is a view analogous to FIG. 2, showing a variant embodiment.

FIG. 5 shows another configuration of a set of two mechanisms, respectively 210 and 310, which serve respectively to drive two wheels 212 and 214 of a first tandem of wheels, and to drive two wheels 312 and 314 of a second tandem of wheels. Each of the mechanisms 210 and 310 includes a motor, respectively 220 and 320, which is analogous to the above-described motor 20, and two driven sprockets respectively 216 & 218 and 316 & 318 connected to the axles 217, 219, 317, 319 of the wheels 212, 214, 312, 314. Each of them also includes driving sprockets, respectively 222 and 224 for the motor 220, and 322 and 324 for the motor 320, the driving sprockets being formed on the casings of the motors. For each mechanism, the wheels are driven by means of chains, respectively the chain 226 which engages the sprockets 222 and 216 and the chain 228 which engages the sprockets 224 and 218 for the first mechanism 210, and, the chain 326 which engages the sprockets 316 and 322 and the chain 328 which engages the sprockets 318 and 324 for the second mechanism 310.

The mechanisms 210 and 310 are analogous to those described above with their variants, but, unlike the variant shown in FIG. 2, the chain case of the first mechanism, and the chain case of the second mechanism together form a common chain case 430 which houses the sprockets and the chains of both mechanisms, and which substantially contains the motors 220 and 320. By indicating that the motors are "substantially" contained in the case 430, the aim is specify that the motors are almost entirely disposed inside the casing, but that their respective connection faces may optionally project slightly therefrom.

FIG. 5 shows the external pipes 260' and 262' connected to the inlet duct and to the outlet duct of the motor 220, and the external pipes 360' and 362' connected to the inlet duct and to the outlet duct of the motor 320. FIG. 5 also shows the external pipes 263' and 363' respectively connected to the leakage return ducts of the motors 220 and 320. These pipes project beyond the connection walls, respectively 431A and 431B of the chain case 430, which walls are provided with openings that give access to the connection faces of the motors. In the FIG. 5 example, the fixing elements of the case, which elements are fixed to the motors 220 and 320 are preferably constituted by the connection walls, respectively 431A for the motor 220 and 431B for the motor 320. The chain case is disposed on the chassis 432 of the vehicle, which chassis is shown completely diagrammatically. The chassis may also carry the elements of the transmission and of the controls of the vehicle, which controls are equipped with the set shown in FIG. 5. The configuration shown in this figure is particularly advantageous when it is desired to reduce the lateral spacing (track) of the wheels of the vehicle to as narrow as possible without being limited in height, because the various elements of the transmission can be disposed above the chain case.

We claim:

1. A drive mechanism for driving first and second displacement members disposed in tandem, the mechanism comprising:

first and second driven sprockets respectively secured to the first and second displacement members;

a hydraulic motor comprising a motor casing, a reaction member integral with the motor casing, and a cylinder block which is mounted so that the reaction member and the cylinder block rotate relative to each other about an axis of rotation, the cylinder block comprising a plurality of sets of cylinders and of pistons suitable for being fed with fluid under pressure;

first and second driving sprockets which are mounted to be rotated by the hydraulic motor; and first and second chains disposed in a chain case the first chain engaging the first driven sprocket and the first driving sprocket, while the second chain engages the second driven sprocket and the second driving sprocket;

wherein the hydraulic motor is a low-speed high-torque motor, whose cylinders are disposed radially about the axis of rotation, whose reaction member is an undulating cam comprising a plurality of lobes, and whose cylinder block is fixed while the reaction member and the motor casing are mounted to rotate about the axis of rotation, wherein the driving sprockets equip the motor casing, and wherein the motor is substantially contained in the chain case.

2. A mechanism according to claim 1, wherein the motor further includes distribution means comprising a rotary portion which is constrained to rotate with the motor casing about the axis of rotation and which is provided with distribution ducts suitable for communicating with the cylinders and a fixed portion which is prevented from rotating about the axis of rotation and which is provided with fluid inlet an fluid outlet ducts suitable for communicating with the distribution ducts of the internal fluid distributor, in that the fixed portion of the distribution means has a connection end face in which the fluid inlet and fluid outlet ducts open out, which ducts have ends situated in the connection face, and in that the chain case is provided with a fixing element to which the motor is fixed and with a connection wall in which at least one opening is provide to enable the fluid to be fed in and to be removed via said-fluid inlet and fluid outlet ducts.

3. A mechanism according to claim 2, wherein the fixing element to which the motor is fixed is provided on the connection wall of the chain case.

4. A mechanism according to claim 3, wherein in the connection face extends transversely relative to the axis of rotation and wherein the cylinder block of the motor has an end face which extends substantially in the same transverse plane as the connection face and which is provided with fixing means for fixing it to the connection wall of the chain case.

5. A set for driving first and second tandems of displacement members for displacing a vehicle, said set comprising first and second mechanisms according to claim 2, respectively for the first tandem and for the second tandem, wherein the connection wall of the chain case of the first mechanism and the connection wall of the chain case of the second mechanism face each other, a space being provided between said walls.

6. A mechanism according to any one of claims 1 to 4, wherein at least one of the driving sprockets is disposed on the outside periphery of a cam portion of the motor casing, the undulating cam being provided on the inside periphery of said cam portion.

7. A mechanism according to any one of claims 1 to 4, wherein the motor casing is supported so that said motor casing can rotate relative to the cylinder block via a single ball bearing having four contact points.

8. A mechanism according to claim 7, wherein the first and second driving sprockets are disposed on said motor casing, on either side of the single bearing having four contact points.

9. A set for driving first and second tandems of displacement members for displacing a vehicle, said set comprising first and second mechanisms according to anyone of claims 1 to 4, respectively for the first tandem and for the second tandem.

10. A set for driving first and second tandems of displacement members of a vehicle, said set comprising first and second mechanism according to any one of claims 1 to 4, respectively, for the first tandem and for the second tandem, and wherein the chain case of the first mechanism, and the chain case of the second mechanism form a common chain case which houses the sprockets and the chains of the first and second mechanisms, and which substantially contains the motors.

11. A mechanism according to claim 1, wherein the driving sprockets are formed in one piece with a portion of the motor casing.

12. A mechanism according to claim 1 in which the motor casing includes at least first and second portions, wherein the first driving sprocket is formed in one piece with the first portion of the motor casing, and the second driving sprocket is formed in one piece with the second portion of the motor casing.

13. A mechanism according to claim 1, wherein at least one of the driving sprockets is formed on a part that is distinct from the casing of the motor and which is fixed to said casing by fixing means for constraining said part to rotate therewith.

* * * * *

UNITED STATES PATENT AND TRADEMARK OFFICE
CERTIFICATE OF CORRECTION

PATENT NO: 6,036,611
DATED: March 14, 2000
INVENTOR(S): Louis BIGO et al.

Figure 3A:
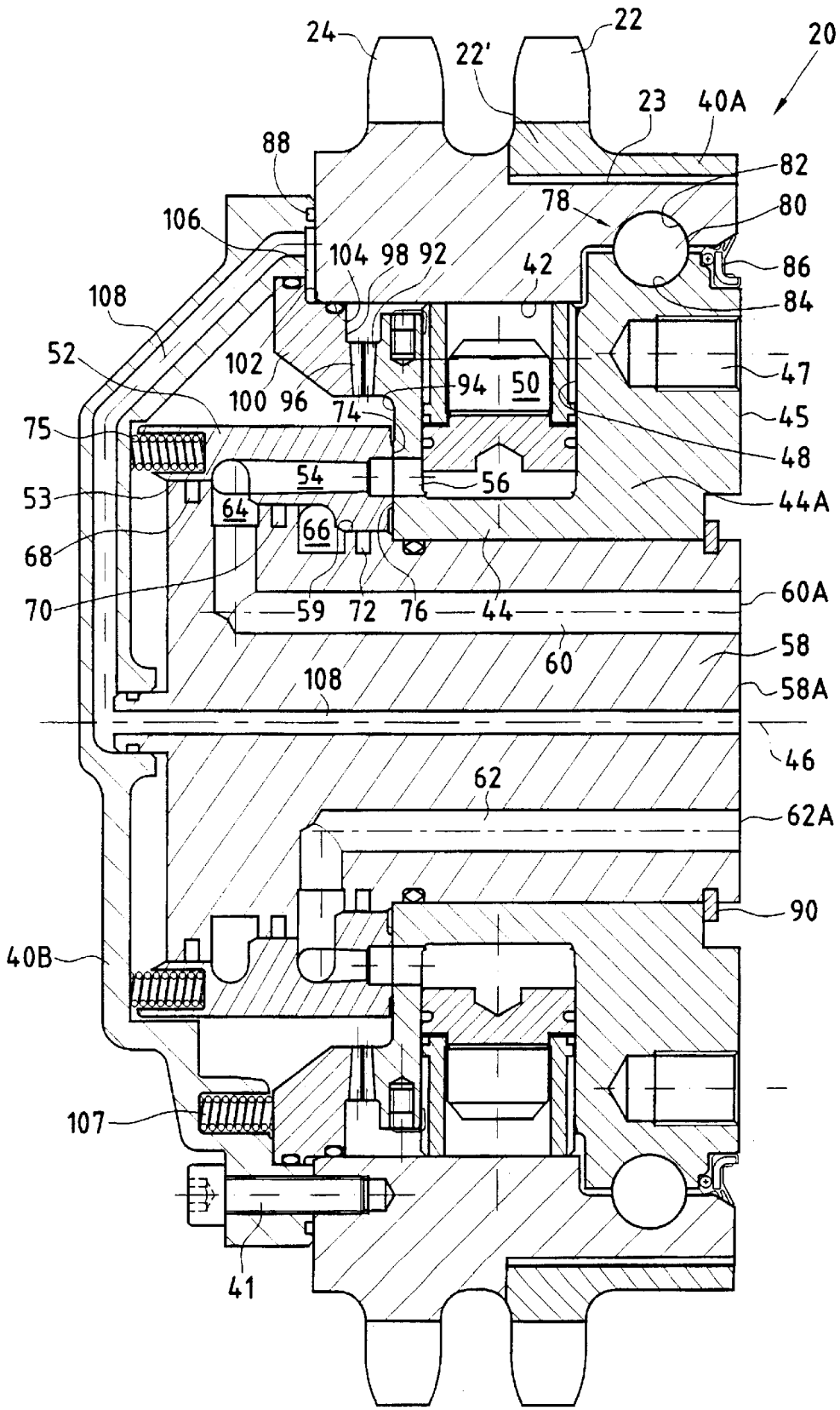
Figure 3B:
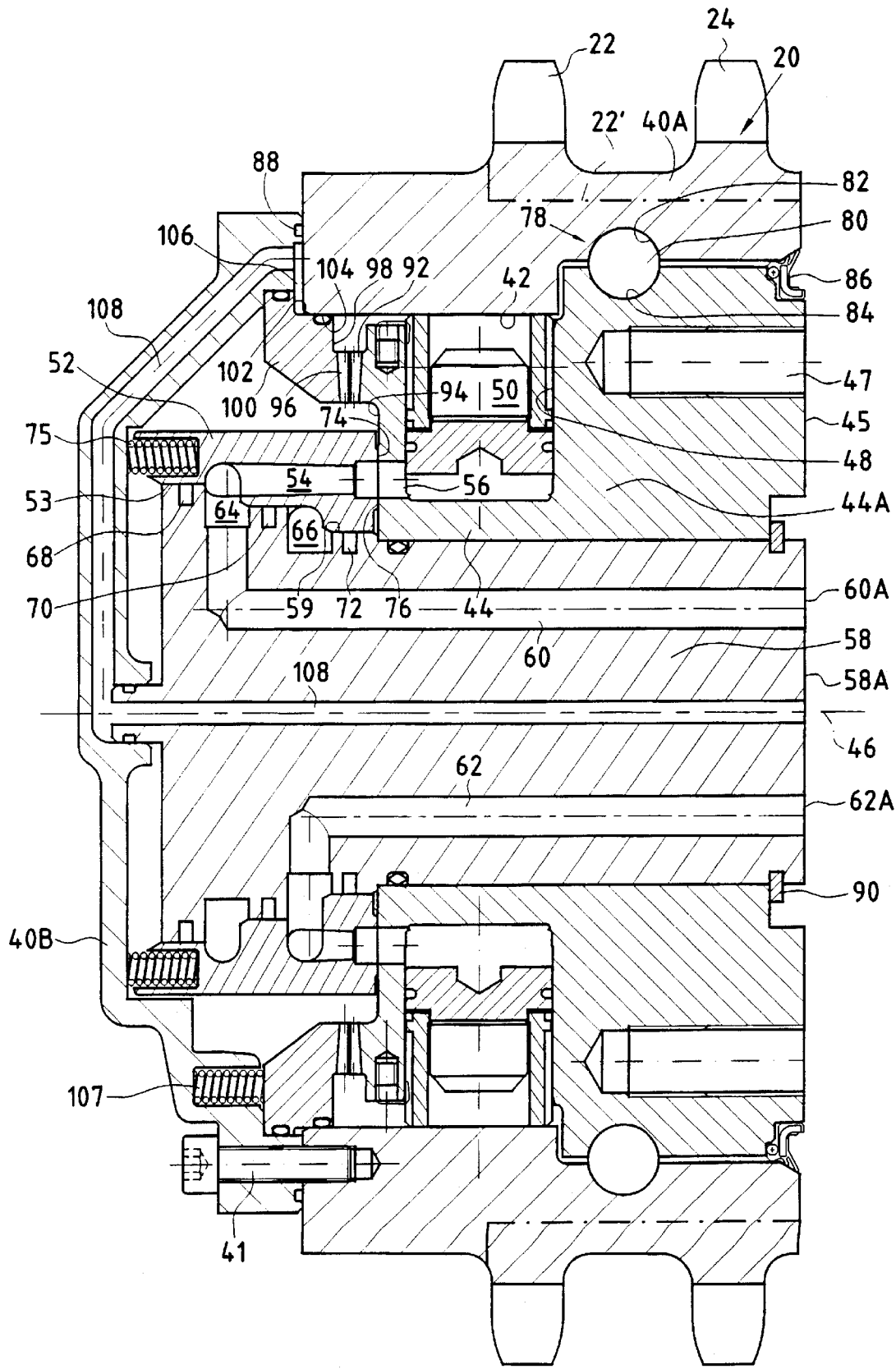

It is certified that error appears in the above-identified patent and that said Letters Patent is hereby corrected as shown below:

| | | |
|---|---|---|
| Column 3, after 41, insert: | --Figure 3a and 3b are axial section views showing some variant embodimentsto Figure 3--. | |
| Column 6, line 27, cancel | "Figure 3 by dashed lines", and insert --Figure 3a--. | |
| Column 6, line 31, after | "The means" insert --23--. | |
| Column 6, line 45, after | "By way of a variant" insert --shown in Figure 3b--. | |

Signed and Sealed this

Third Day of April, 2001

Attest:

NICHOLAS P. GODICI

Attesting Officer

Acting Director of the United States Patent and Trademark Office